No. 834,223. PATENTED OCT. 23, 1906.
V. W. BLANCHARD.
GAS BURNING, HEATING AND COOKING STOVE.
APPLICATION FILED JAN. 22, 1906.

WITNESSES:
INVENTOR
Virgil W. Blanchard
By
Alexander & Fowell
Attorneys.

UNITED STATES PATENT OFFICE.

VIRGIL W. BLANCHARD, OF NEW YORK, N. Y.

GAS-BURNING, HEATING AND COOKING STOVE.

No. 834,223.  Specification of Letters Patent.  Patented Oct. 23, 1906.

Application filed January 22, 1906. Serial No. 297,257.

*To all whom it may concern:*

Be it known that I, VIRGIL W. BLANCHARD, of New York, in the county of New York and State of New York, have invented certain new and useful Improvements in Gas-Burning, Heating and Cooking Stoves; and I hereby declare that the following is a full, clear, and exact description thereof, reference being had to the accompanying drawings, which form part of this specification.

This invention is an improvement in gas-burning, heating and cooking stoves, but more particularly designed for cooking-stoves. Its objects are to enable the flow of the gases to be readily controlled in their passage from the burner, to provide a novel heating-plate adapted to become very highly heated by the products of combustion and to radiate its heat directly upward in the most advantageous manner against the superimposed cooking vessel, if desired, and also to form, with the underlying air-supplying plate, means for insuring thorough oxidation of the gaseous products of combustion.

The invention in particular is an improvement upon the stove shown in my application for gas cooking-stoves, Serial No. 297,250, filed January 22, 1906, and will be fully understood from the following description, in connection with the accompanying drawings, in which—

Figure 1:
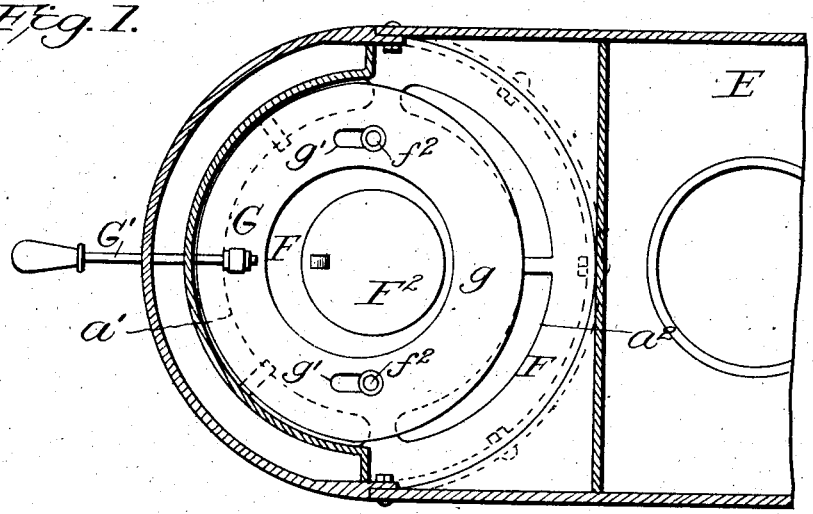
Figure 2:
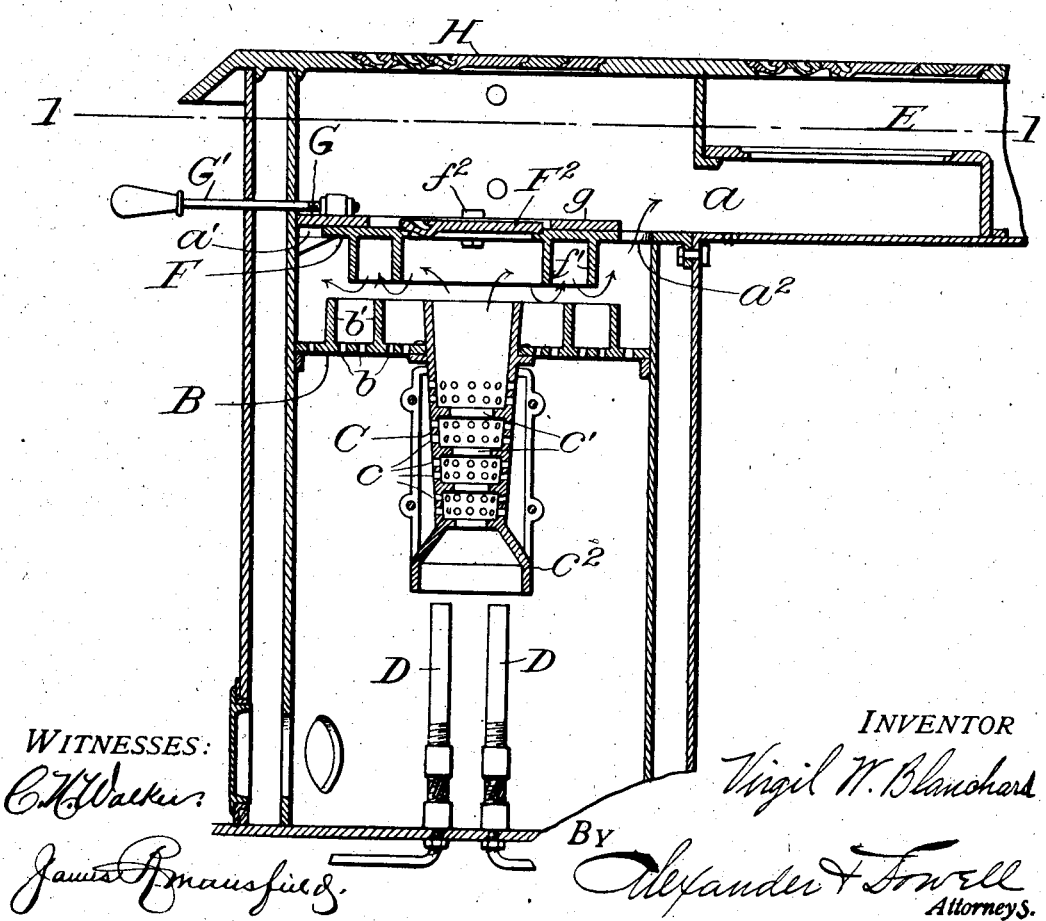

Figure 1 is a horizontal sectional view on line 1 1, Fig. 2; and Fig. 2 is a vertical section of the upper portion of the stove, showing the parts embodying the present invention.

The casing of the stove is preferably double-walled, so as to prevent loss of heat by conduction and radiation, and is also preferably cylindrical in cross-section. In the upper part of this casing is a transverse perforated partition-plate B, from which is suspended a centrally-disposed burner C, provided with perforations $c$ in its sides and internal constrictions $c'$ and with a hood $c^2$ on its lower end, into which gaseous mixtures are discharged from mixing-tubes D. This burner and mixing-tubes are preferably constructed as described in my application for gas-burners, Serial No. 297,240, filed January 22, 1906, and need not be further explained in detail herein. It is adapted to produce perfect combustion of all the fuel elements and to discharge large volumes of heated products above the partition B, which products are mixed with quantities of air entering through the perforations $b$ in partition B. Preferably this partition B has a series of annular upstanding ribs $b'$ on its upper surface for a purpose hereinafter explained. The said gases escape from the upper part of the stove through an outlet $a$ at one side thereof into a range extension E, which is preferably constructed as described in my application for gas cooking stoves or ranges, Serial No. 297,251, filed January 22, 1906.

Arranged at the lower edge of the outlet $a$ and above the partition B is a transversely-arranged plate F. This, as shown, may approximately conform in contour to the internal cross-section of the stove; but at the side opposite the outlet $a$ an outlying space or flue $a'$ is left between the edge of the plate F and the inner wall of the stove. At the side adjacent to outlet $a$ partly-cylindric slots $a^2$ are formed in the plate, through which gases may pass directly to outlet $a$. The plate F is preferably provided on its under side with downwardly-extending annular ribs or flanges $f'$, which preferably alternate in position with the upstanding flanges $b'$ on partition B. The flanges $f'$ form pockets or chambers on the under surface of plate F, which are adapted to detain the hot products of combustion arising from the burner and insure the thorough oxidation of the lighter elements in the gases, which might possibly escape if afforded a direct outlet.

By means of the flanges $f'$ and $b'$ the gases are caused to take an upward and downward or tortuous course, as indicated by the arrows, in passing from the burner under plate F toward the sides of the stove, and in such passage they are subjected to the action of and commingled with jets of fresh air rising through perforations $b$ in partition B.

On top of partition F, I place a double-acting damper or valve which is provided with a front portion G, adapted when the valve is drawn outwardly to cover the opening or flue-space $a'$, and on its inner side with a portion $g$, adapted when the valve is pushed inward to cover the slots or flue-openings $a^2$, so when one opening is closed the other is open, and vice versa; but by moving the valve to an intermediate position both openings $a'$ and $a^2$ might be left partly open.

The valve is preferably annular and surrounds an opening in the upper part of plate F, which can be closed by a lid $F^2$, which lid can be removed in case it be desired to place a utensil upon plate F within the stove to be heated.

The valve G may be provided with slots $g'$, transfixed by pins $f^2$, attached to plate F, so that the valve will be properly guided in its movements, and it can be operated by a pull-rod $G'$, extending through an aperture in the front wall of the stove.

In the top of the stove, above plate F, may be an opening closed by nested lids H, any one of which can be removed to accommodate a vessel of corresponding size, and in the range extension similar openings may be provided. The heated gases pass directly from the stove to and through the range portions, as described in my application for gas cooking stoves and ranges, Serial No. 297,251, filed January 22, 1906, The burner, partition B, and plate F and valve G all become highly heated, particularly the portions of the plate F directly over the burner, and will be maintained at a bright red heat, so that the upper parts of the stove and vessels placed thereon can be quickly and highly heated by radiation from the said plate. If the vessel be placed over the adjacent opening in the top of range E, by fixing the valve in the position shown in Fig. 2 the heated gases will be discharged almost directly into the range and under such vessel through the openings $a^2$ and $a'$, while the vessel placed on top of the stove above the plate F will be heated by radiation from said plate.

If it be desired to increase the temperature of lids H or vessels substituted therefor, the valve G may be pushed inward to partly or wholly close openings $a^2$ or partly or wholly open opening $a'$, so that the gases will be discharged directly upward against the top of the stove before passing into the range extension. By this means I am able to control the heat in the most advantageous manner.

Having thus described my invention, what I therefore claim as new, and desire to secure by Letters Patent thereon, is—

1. In a gas-burning stove, the combination of a burner, a plate superimposed above the burner having openings for the escape of the heated gases, and a depending annular flange adapted to detain the products of combustion, and a slide-valve mounted on said plate adapted to control the flow of heated gases.

2. In a gas-burning stove, the combination of a burner, a plate superimposed above the burner having side openings, a depending annular flange adapted to detain heated gases, and a central opening, a lid covering such central opening, and a sliding valve mounted on said plate adapted to control the flow of heated gases through the side openings.

3. In a gas-burning stove, the combination of a burner, a plate superimposed above the burner, passages or openings at the front and rear sides of the plate, and an annular slide-valve resting on the plate adapted to close either of said openings and simultaneously open the other.

4. In a gas-burning stove, the combination of a burner, a plate superimposed above the burner provided with a central opening, and gas-passages at front and rear of said plate, a lid across said central opening, and an annular sliding valve resting on the plate adapted to close either of the passages and open the other.

5. The combination in a gas-burning stove, of the casing, a partition suspended therein, a burner connected with said partition, a plate above the partition arranged to leave flues for products of combustion around its edges and a valve supported on said plate adapted to close the flue at one side of the plate and simultaneously open the flue at the other side thereof.

6. The combination in a gas-burning stove, of the casing, a perforated partition suspended therein, a burner connected with said partition and discharging above the same, a plate above the partition arranged to leave flues for products of combustion around its edges, and a sliding valve supported on said plate adapted to close the flue at one side of the plate and simultaneously open the flue at the other side thereof.

7. The combination in a gas-burning stove, of the casing, a partition therein provided with upstanding, annular flanges, a burner, an outlet for the products of combustion, a plate located above the partition and below the outlet and provided with depending annular ribs, and passages for the escape of gases at front and rear of the plate, a sliding valve mounted on said plate and means for moving said valve, whereby either passage may be opened and simultaneously the other passage closed.

8. In a gas-burning stove, the combination of a casing, a perforated partition therein provided with upstanding annular flanges, a burner suspended from said partition and adapted to discharge the products of combustion above the same, an outlet for the products of combustion above the partition, a plate located above the partition and below the outlet, and provided with depending annular ribs, a sliding valve mounted on said plate and means for moving said valve.

In testimony that I claim the foregoing as my own I affix my signature in presence of two witnesses.

VIRGIL W. BLANCHARD.

In presence of—
T. H. ALEXANDER,
JAMES R. MANSFIELD.